(12) United States Patent
Margaritelli (10) Patent No.: US 10,929,532 B1
(45) Date of Patent: Feb. 23, 2021

(54) DETECTING MALWARE IN MOBILE APPLICATIONS VIA STATIC ANALYSIS

(71) Applicant: Zimperium, Inc., Dallas, TX (US)

(72) Inventor: Simone Margaritelli, Monterotondo (IT)

(73) Assignee: Zimperium, Inc., Dallas, TX (US)

( * ) Notice: Subject to any disclaimer, the term of this patent is extended or adjusted under 35 U.S.C. 154(b) by 271 days.

(21) Appl. No.: 16/125,593

(22) Filed: Sep. 7, 2018

(51) Int. Cl.
*G06F 21/56* (2013.01)
*G06N 20/00* (2019.01)

(52) U.S. Cl.
CPC ........... *G06F 21/562* (2013.01); *G06N 20/00* (2019.01); *G06F 2221/033* (2013.01)

(58) Field of Classification Search
CPC .. G06F 21/562; G06F 2221/033; G06N 20/00
See application file for complete search history.

(56) References Cited

U.S. PATENT DOCUMENTS

| | | | |
|---|---|---|---|
| 8,401,982 B1 | 3/2013 | Satish et al. | |
| 8,826,439 B1 | 9/2014 | Hu et al. | |
| 9,479,357 B1 | 10/2016 | Fu et al. | |
| 2016/0078362 A1* | 3/2016 | Christodorescu | G06F 21/554 706/12 |
| 2017/0169224 A1* | 6/2017 | Park | G06F 21/566 |
| 2017/0318026 A1* | 11/2017 | Lu | G06F 21/51 |
| 2019/0213099 A1* | 7/2019 | Schmidt | G06F 9/5083 |

* cited by examiner

*Primary Examiner* — Nelson S. Giddins
(74) *Attorney, Agent, or Firm* — Fenwick & West LLP (57) ABSTRACT

A trained classifier is received from a server. Static analysis is performed on a mobile application to generate a vector storing values representing the number of times the mobile application calls functions from each of multiple namespaces, and an indication of the permissions the mobile application requests. The received trained classifier is then applied to the generated vector to identify whether the mobile application contains malware. Based on the output of the trained classifier, a security policy is applied.

20 Claims, 5 Drawing Sheets

DETECTING MALWARE IN MOBILE APPLICATIONS VIA STATIC ANALYSIS

BACKGROUND OF THE INVENTION

1. Field of the Disclosure

The present disclosure relates to detecting malicious software (malware) and more specifically to using static analysis to determine whether a mobile application contains malware.

2. Description of the Related Art

Malicious actors use malware to compromise computer systems in order to steal information, access secure systems, obtain a monetary gain, etc. Malware threats include computer viruses, worms, Trojan horse programs, spyware, and adware. Nowadays, mobile devices, such as smartphones, are also susceptible to malware. In particular, users may download mobile applications from third party stores or other untrusted sources to their mobile devices. These mobile applications may appear legitimate but have latent malicious functionality. Even applications downloaded from trusted application stores such as those provided by major hardware and software vendors may include latent malware that was not detected by the administrators of the trusted stores.

Detecting malware on mobile devices is challenging. Mobile devices have limited processing power, battery reserves, and storage. Moreover, the operating systems of mobile devices may prevent mobile applications from monitoring activities of other mobile applications on the devices. Network connectivity with a server may also be sparse or bandwidth constrained. These limitations restrict the types of malware detection that are feasible to perform on mobile devices. As a result, the possibility of malware on mobile devices is an ongoing concern.

SUMMARY

Embodiments of the present disclosure include methods (and corresponding systems and computer program products) for classifying mobile applications as malicious or legitimate. The disclosed techniques allow a client device to classify the mobile applications using a locally-stored classifier, thus allowing the malware detection to be performed in environments where network connectivity is limited or not available. Moreover, the disclosed methods allow a client device to identify whether a mobile application is malware without having to monitor the execution of the mobile application. As such, the malware detection can be performed in a client device even when the operating system of the client device prevents the malware detection application from interacting with other applications or when the operating system of the client device prevents the malware detection application from monitoring resources used by other mobile application running in the client device.

One aspect of the present disclosure is a computer-implemented method for detecting malware. The method comprises receiving a training set including a plurality of mobile applications containing malware and a plurality of mobile applications not containing malware. The method performs static analysis on the plurality of mobile applications included in the training set. The static analysis comprises generating a vector for a mobile application of the plurality of mobile applications. Generating the vector may include, for each namespace of a plurality of namespaces, identifying a number of times the mobile application calls a function from the namespace. Generating the vector may also include identifying a set of permissions the mobile application requests and determining whether particular ones of a plurality of character strings are found within the mobile application. The generated vector stores values representing the number of times the mobile application calls a function from each of the namespaces, an indication of the permissions the mobile application requests, and values indicating which particular ones of the plurality of character strings are found within the mobile application. The method further comprises training a classifier for detecting malware using the generated vector and providing the trained classifier to a client device. The client device is adapted to apply the trained classifier on a vector for a candidate mobile application to determine whether the candidate application contains malware.

Another aspect of the present disclosure is a non-transitory computer readable storage medium storing executable computer program code for detecting malware. The code when executed by a processor cause the processor to perform operations comprising receiving a training set including a plurality of mobile applications containing malware and a plurality of mobile applications not containing malware. The operations perform static analysis on the plurality of mobile applications included in the training set. The static analysis comprises generating a vector for a mobile application of the plurality of mobile applications. Generating the vector may include, for each namespace of a plurality of namespaces, identifying a number of times the mobile application calls a function from the namespace. Generating the vector may also include identifying a set of permissions the mobile application requests and determining whether particular ones of a plurality of character strings are found within the mobile application. The generated vector stores values representing the number of times the mobile application calls a function from each of the namespaces, an indication of the permissions the mobile application requests, and values indicating which particular ones of the plurality of character strings are found within the mobile application. The operations further comprise training a classifier for detecting malware using the generated vector and providing the trained classifier to a client device. The client device is adapted to apply the trained classifier on a vector for a candidate mobile application to determine whether the candidate application contains malware.

Another aspect of the present disclosure is a computer-implemented method for determining whether a mobile application is malware. The method comprises receiving a trained classifier for detecting malware and performing static analysis on the mobile application. The static analysis comprises generating a vector. Generating the vector may include, for each namespace of a plurality of namespaces, identifying a number of times the mobile application calls a function from the namespace. Generating the vector may also include identifying a set of permissions the mobile application requests and determining whether particular ones of a plurality of character strings are found within the mobile application. The generated vector stores values representing the number of times the mobile application calls a function from each of the namespaces, an indication of the permissions the mobile application requests, and values indicating which particular ones of the plurality of character strings are found within the mobile application. The method further comprises applying the received trained classifier to the generated vector and applying a security policy to the mobile device based on an output of the trained classifier applied to the generated vector.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments. Wherever practicable, similar or like reference numbers are used in the figures to indicate similar functionality.

System Environment

Figure 1:
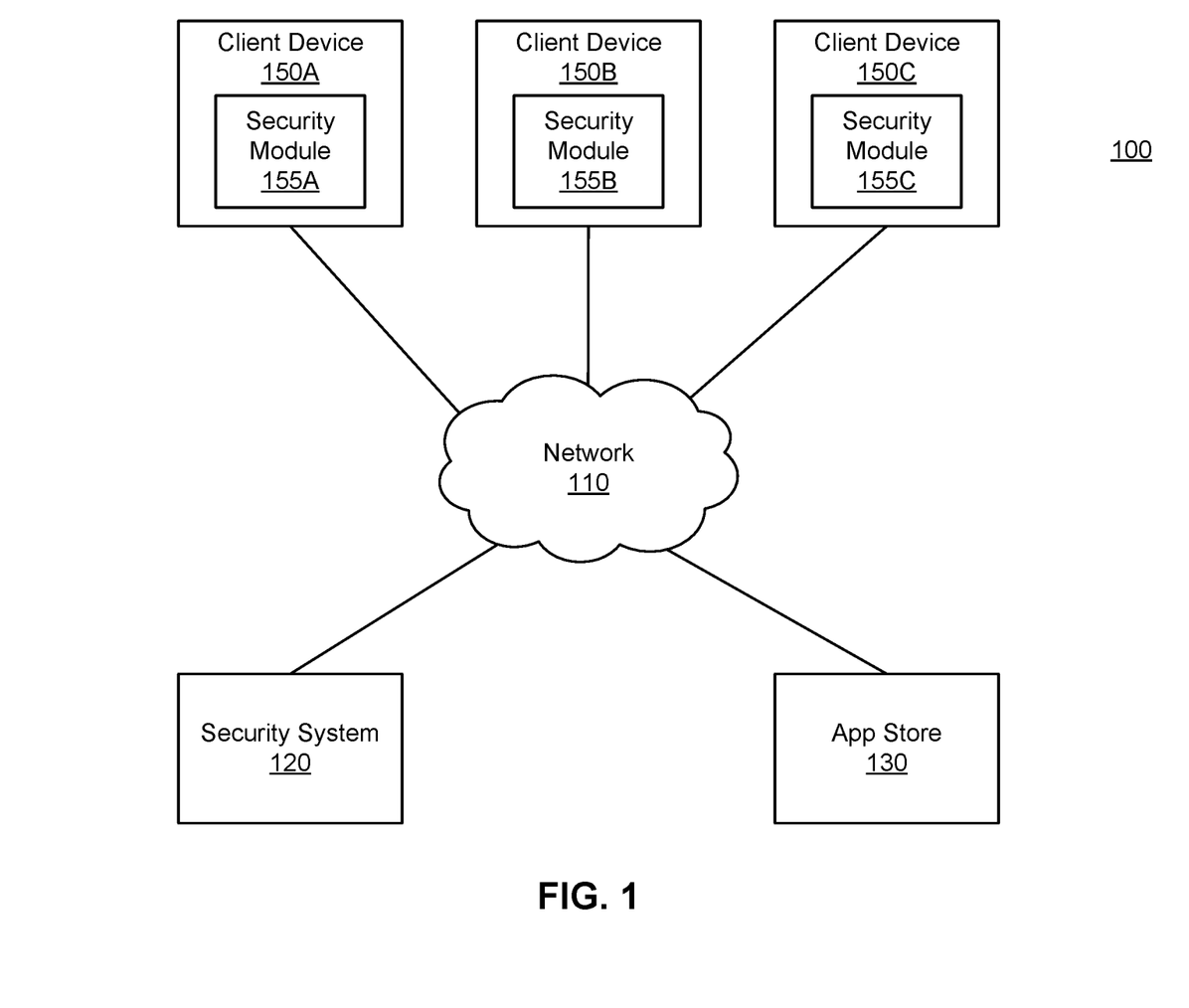
FIG. 1 is a high-level block diagram that illustrates a computing environment for detecting malware in applications executing on mobile devices according to one embodiment.

FIG. 1 is a high-level block diagram that illustrates a computing environment 100 for detecting malware in applications executing on mobile devices according to one embodiment. As shown, the computing environment 100 includes multiple client devices 150, a security system 120, and an application (app) store 130 connected through a network 110. There can be other entities in the computing environment 100 as well. While only three client devices 150 are illustrated in FIG. 1, embodiments of the environment 100 may have many such devices. Likewise, the environment may have multiple security systems 120 and app stores 130.

A client device 150 is an electronic device that can host malicious software. In one embodiment, the client device 150 is a mobile device having computer functionality. For example, the client device 150 may be a mobile telephone, tablet computer, or gaming system. Such devices execute an operating system such as iOS from APPLE INC., a version of ANDROID from GOOGLE LLC or third parties, or a LINUX distribution. The client device 150 may also be a computer system such as a desktop or notebook computer. These types of computer systems execute operating systems such as WINDOWS from MICROSOFT CORPORATION or macOS from APPLE INC. Client devices 150 that are mobile devices typically have limited processing power, memory, storage, and power reserves (e.g., battery power) as compared to computer systems.

A client device 150 typically stores numerous files which implement one or more mobile applications that execute on the client device 150. These files may include malware. "Malware" is generally defined as software that executes on the client device 150 surreptitiously or that has some surreptitious functionality. Malware can take many forms, such as parasitic viruses that attach to legitimate files, worms that exploit weaknesses in the client device's security in order to infect the computer and spread to other devices, Trojan horse programs that appear legitimate but actually contain latent malicious code, and/or spyware that monitors keystrokes and/or other actions on the client device 150 in order to capture sensitive information or display advertisements. The operating systems of mobile devices often restrict the ability of a mobile application executing on a mobile device to access certain resources present on the mobile devices. For example, the operating system of a mobile device may restrict a mobile application from observing the execution of other applications executing on the device. Such restrictions may limit the amount of harm malware can inflict on the mobile device 150.

A client device 150 executes a security module 155 for detecting the presence of malware. The security module 155 can be, for example, a standalone mobile application, a component of another mobile application, and/or incorporated into the operating system of the client device 150 depending upon the embodiment. In one embodiment, the security module 155 is provided by the entity that operates the security system 120.

The security module 155 monitors candidate mobile applications stored on the client device 150 and collects information related to the applications. For example, the security module 155 can be configured to analyze mobile applications downloaded from the app store 130 before the downloaded mobile application is installed on the client device 150. In another example, the security module 155 analyzes mobile applications that have been recently installed, updated, and/or modified. In one embodiment, the security module 155 performs static analyses of candidate applications and builds feature vectors describing the applications. Specifically, the feature vector describes permissions requested as well as the numbers of function calls made to specific namespaces by a candidate application. The feature vector may also describe whether specific text strings are found within the mobile application (e.g., within the binary application file).

The security module 155 communicates with the security system 120 via the network 110. The security module 155 receives a machine-learned malware detection classifier from the security system 120 and applies the feature vectors built for the candidate applications to the classifier. The classifier outputs one or more values indicating likelihoods that individual candidate applications contain malware.

The security module 155 selects and enforces an applicable security policy to a candidate mobile application based on the output of the classifier. The security policy may also be selected based on a combination of the output of the classifier and other analyses of the mobile application conducted by the security module 155. For example, if a candidate mobile application is classified as malware, the security module 155 may prevent the mobile application from being installed and/or from being executed on the client device 150. The security module 155 may quarantine the malware to prevent it from performing malicious actions, clean the malware from the candidate application, delete the candidate application from the client device 150, generate a warning message to a user of the client device regarding the malware, and/or perform other actions depending on the policy. On the other hand, if the mobile application is classified as legitimate, the security module 155 may permit the mobile application to be installed and run on the client device 150.

The security system 120 is operated by a security software provider and provides security services and/or software to the client devices 150. In one embodiment, the security system 120 is a server that generates machine-learned malware detection classifiers and provides the classifiers to the client devices 150. The server may be web-based, on premises, or at other locations. The security system 120 trains the malware detection classifiers using labeled training sets including mobile applications known to be malware and mobile applications known to not contain malware (i.e., goodware). The security system 120 uses static analyses of the mobile applications to generate corresponding feature vectors, and trains the classifiers to distinguish between feature vectors of malware and goodware applications. The security system 120 may also provide security software for controlling use of the classifiers to the client devices 150. Likewise, the security system 120 may provide the security software and/or classifiers to the app store 130 for subsequent distribution to the client devices 150.

The application ("app") store 130 provides mobile applications to client devices 150. In some embodiments, the app store 130 is a first party app store that stores mobile applications that have been verified by the first party system. In other embodiments, the app store is a third party app store that provides unverified mobile applications. The mobile applications provided by the app store 130 may be organized as an installation package including the executable code and a manifest specifying how the code should behave when installed on a client device 150. The app store receives requests from client devices 150 to download mobile applications, and the app store 130 provides the mobile applications (e.g., application package files) to the client devices 150.

A mobile application provided by the app store 130 may include malware. Therefore, a user of a client device 150 may unknowingly download a mobile application containing malware to the client device and thereby compromise the security of the client device. The security module 155 on the client device 150 mitigates this risk by analyzing the mobile application to determine whether it contains malware, and applying a security policy to the mobile application and/or client device based on the result of the analysis. The static analysis using the feature vector and malware detection classifier performed by the security module 155 is particularly suited to the mobile environment because it effectively detects malware without requiring the security module 155 to monitor the execution of the mobile application (which may be prohibited by the operating systems of some mobile devices). In addition, this malware detection technique is relatively lightweight and makes effective use of the limited processing power, battery reserves, and other resources of the client device 150.

The network 110 enables communications between the client devices 150, the security system 120, and the app store 130. In one embodiment, the network 110 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), Protocol Buffers (Protobuf), JavaScript Object Notation (JSON), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks such as the Internet. The client device 150 does not require a connection to the network 110 in order to perform the malware detection described herein.

Example Architectural Overview of the Security System

Figure 2A:
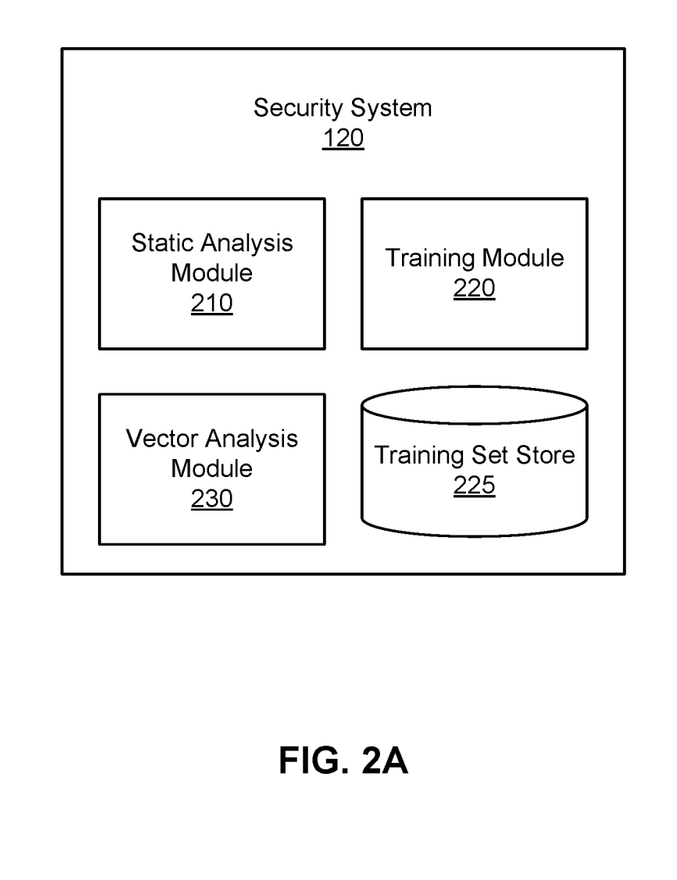
FIG. 2A is a high-level block diagram illustrating a detailed view of modules within the security system, according to one embodiment of the present disclosure.

FIG. 2A is a high-level block diagram illustrating a detailed view of modules within the security system 120, according to one embodiment. Some embodiments of the security system 120 have different and/or other modules than the ones described herein. Similarly, the functions can be distributed among the modules in accordance with other embodiments in a different manner than is described here. As illustrated, the security system 120 includes a static analysis module 210, a training module 220, a training set store 225, and a vector analysis module 230.

The training set store 225 stores labeled training data including one or more training sets used by the training module 220 to generate the malware detection classifier. The training sets include positive samples of mobile applications known to be malware or contain malware code, and negative samples of mobile application known not to be malware and not to contain malware code (i.e., goodware).

The static analysis module 210 analyses the malware and goodware mobile applications included in the training sets stored in the training set store 225, and generates app vectors representing the analyzed mobile applications. The static analysis module 210 analyzes a mobile application without running or executing the mobile application. In some embodiments, the static analysis module 210 analyses the application package file that contains a manifest file including metadata for the mobile application, executable code for the mobile application, assets used by the application, resources used by the application, and/or certificates for the mobile application.

The manifest file of the mobile application describes the resources (e.g., classes, services, code libraries) used by the mobile application. The static analysis module 210 uses the manifest file to distinguish native executable code specific to the application from library code used within the application. For example, the manifest file is an extensible markup language (XML) file parsed by the static analysis module 210 to identify dependencies and libraries used by the mobile application. The static analysis module 210 may look for specific tags in the manifest file that identify code libraries used by the application. The static analysis module 210 may further examine the executable code of the application and use the labels to distinguish the native code specific to the application from the library code incorporated into the application.

The static analysis module 210 decompiles the native code of the application. Then, the static analysis module 210 identifies entry points to the application using the decompiled native code. An entry point is a portion of the code of the application where control is transferred to the application from the operating system or another application.

The static analysis module 210 traces through the decompiled code from the identified entry points and generates one or more execution graphs describing the execution flow of the application. In one embodiment the static analysis module 210 generates a separate execution graph for each identified entry point. An execution graph is a directed graph having nodes representing functions within the code and edges representing other functions called by the functions. For example, the root node of the execution graph may represent the function at the entry point, and the root node may include one or more edges pointing to nodes representing other functions called by the entry point. The static analysis module 210 recursively traces through the code from the entry point in order to generate an execution graph representing the possible flows of execution through the code. The functions represented by the nodes of an execution graph may represent internal functions within the native code, or external functions (e.g., functions within external code libraries) called by the native code.

Using the generated execution graphs, the static analysis module 210 then determines the number of times calls are made to functions in various external namespaces. As used herein, a namespace is a declarative region that provides scope to the identifiers (e.g., the names of functions) within it. An external code library may define one or more namespaces within it. To determine the number of calls, the static analysis module 210 traverses the execution graphs and at each node determines whether the function represented by the node is within the native code or external to the native code. If the function is external, the static analysis module 210 determines the namespace in which the function resides, and increments a counter associated with that namespace.

In some embodiments, the static analysis module 210 only counts calls to preselected namespaces. For instance, the static analysis module 210 keeps track of namespaces related to specific activities such as networking, file input/output (IO), data encryption, data encoding, command execution, location services, telephony services, media, hardware resources, clipboard services, account administration, operating system services, and the like. The static analysis module 210 may also aggregate counts of related namespaces. For example, if there are multiple namespaces related to data encryption, the static analysis module 210 may use a single counter to count function calls to any of the multiple related namespaces.

The static analysis module 210 stores the counts for each of the tracked namespaces in an app vector. The app vector is an array of elements, where each element has a value representing the count of an associated namespace (which may also include the count for an aggregation of related namespaces). In embodiments where there are multiple execution graphs for a mobile application, the static analysis module 210 may sum the counts for the execution graphs into a single app vector for the application. In one embodiment, the static analysis module 210 additionally normalizes the counts for value to values between and including zero and one.

The static analysis module 210 further identifies the permissions requested by the mobile application. The requested permissions describe resources of the operating system and/or client device 150 to which the mobile application requests access. The static analysis module 210 may identify whether a mobile application requests certain permissions of a subset of permissions available on the client device 150. For example the static analysis module 210 may track requested permissions related to accessing content stored the client device 150, accessing location information, accessing communications interfaces (e.g., permissions involving the Bluetooth interface), using the camera and/or audio capture, and/or other aspects of the client device.

The static analysis module 210 identifies the requested permissions by inspecting the manifest file of the mobile application. The static analysis module 210 may also identify the requested permissions by identifying functions that request permissions within the execution graphs of the mobile application.

The static analysis module 210 stores an indication of the permissions requested by the mobile application in a second portion of the app vector. That is, a first portion of the app vector stores the counts associated with the various namespaces, and a second portion of the app vector stores indications of the permissions requested by the mobile application. The indications of the permissions requested by the mobile application are stored as one-hot encoded binary values.

Additionally, an embodiment of the static analysis module 210 identifies whether a set of preselected character strings are present within the binary executable file for the mobile application. The static analysis module 210 contains or accesses a list of specific strings that may be present in the mobile application. As with the tracked namespaces, these strings may be related to functions that may be exploited by malware. For instance, the strings may be related to resources such as mobile and email messaging, web browsing, calling, calendaring, and mobile device settings. Specific strings detected may include: "sms," "contacts," "browser," "call_log," "email," "calendar," and "settings/system."

The static analysis module 210 stores indications of whether particular strings are present in the mobile application in a third portion of the app vector. In one embodiment, the indications of whether the strings are present are stored as binary values, where different elements of the app vector corresponds to different strings that may be present within the application. In another embodiment, the app vector stores indications of the number of times each string appears in the mobile application.

The training module 220 trains a model for detecting whether a mobile application contains malware using the app vectors generated by the static analysis module 210 for mobile applications in the training sets. The training module 220 applies machine learning techniques to generate the malware detection model that when applied to an app vector for a candidate mobile application, outputs an indication of whether the candidate mobile application is malware.

The training module 220 uses supervised machine learning to train the malware detection model, with the app vectors from the positive training set (i.e., malware mobile applications) and the negative training set (i.e., goodware mobile applications) serving as inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

In one embodiment, the training module 220 use the app vectors to train a malware detection classifier. The classifier is a machine-learned model that when given an app vector for a mobile application, outputs a value indicating a likelihood that the mobile application contains malware. The training module 220 stores the malware detection classifier. In addition, the training module 220 may periodically retrain the malware detection classifier as new training data are added to the training set store 225.

The vector analysis module 230 analyzes the app vectors generated by the static analysis module 210 to obtain information about malware in the training set store 225. In one embodiment the vector analysis module 230 clusters together mobile applications based on similarity of associated app vectors. For example, the vector analysis module 230 may determine distances between app vectors of various mobile applications and group together app vectors (and associated mobile applications) with distances lower than a threshold value. Mobile applications with similar app vectors by definition have similar behaviors. Therefore, the clusters of mobile applications may represent applications incorporating a same or similar type of malware (e.g., a malware family). The clusters can thus be used to determine sources of malware and to generate malware signatures or other information that can be used to detect the malware apart from the app vectors.

Further, an embodiment of the vector analysis module 230 uses differences in app vectors associated with similar mobile applications to detect latent malware. For example, the vector analysis module 230 may determine that two samples of a mobile application that are purportedly the same (e.g., have the same name) have app vectors that differ by more than a threshold amount. This situation may arise where one version of the mobile application has injected latent malware (e.g., is a Trojan horse). The vector analysis module 230 may then flag one or both of the samples for review by an analyst and/or perform additional automated analysis to determine whether either of the samples contains malware.

Example Architectural Overview of the Security Module

Figure 2B:
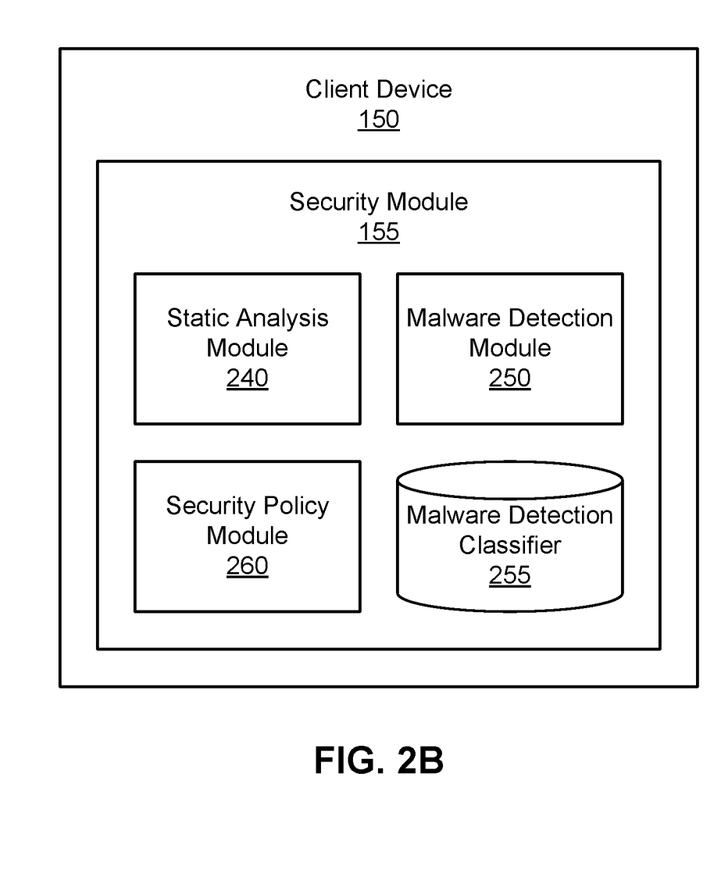
FIG. 2B is a high-level block diagram illustrating a detailed view of modules within the security module of a client device, according to one embodiment of the present disclosure.

FIG. 2B is a high-level block diagram illustrating a detailed view of modules within the security module 155 of a client device 150, according to one embodiment. Some embodiments of the security module 155 have different and/or other modules than the ones described herein. Similarly, the functions can be distributed among the modules in accordance with other embodiments in a different manner than is described here. As illustrated, the security module 155 includes a static analysis module 240, a malware detection module 250, a malware detection classifier 255, and a security policy module 260.

The static analysis module 240 of the security module 155 analyses mobile applications downloaded by the client device 150 or otherwise stored in a storage device of the client device. The static analysis module 240 receives code for a mobile application installed in the client device 150 or an installation package for a mobile application to be installed in the client device 150, and performs a static analysis to generate an app vector for the mobile application. The static analyses performed by the static analysis module 240 of the client device 150 use the same techniques as the static analyses performed by the static analysis module 210 of the security system 120 and generates corresponding app vectors. In some embodiments, the static analysis module 240 is the same as the static analysis module 210 of the security system 120. In other embodiments, the static analysis module 240 is optimized to be run by a mobile device.

The malware detection classifier 255 is received from the security system 120 and is stored locally in a storage device of the client device 150. In some embodiments, the malware detection classifier is provided to the client device when the security module 155 is installed. In some embodiments, the security module 155 periodically downloads an updated malware detection classifier 255 from the security system 120.

The malware detection module 250 applies the malware detection classifier 255 to an app vector for the application generated by the client static analysis module 240 to determine whether the mobile application contains malware. The malware detection module 250 receives the app vector generated by the static analysis module 240 and applies the classifier to the received app vector to generate an indication of whether the mobile application associated with the received app vector is malware or goodware. In some embodiments, the output of the malware detection module 250 is a score indicating the likelihood that the mobile application is malware. In other embodiments, the output of the malware detection module 250 is a Boolean value indicating whether the mobile application is malware or goodware.

Since the classifier is stored locally, the malware detection module 250 is capable of determining whether a mobile application is malware without having to be connected to the network 110. In another embodiment, however, the malware detection module 250 provides the app vector generated at the client device 150 to the security system 120 via the network 110. The security system 120 applies the classifier stored at the security system 120 to the client-generated app vector to determine whether the app vector indicates malware. The security system 120 provides the output of the classifier to the malware detection module 250 of the security module 155 on the client device 150. Therefore, the client device 150 does not need to store the classifier in this embodiment.

The security policy module 260 selects and applies a security policy based on the output of the malware detection module 250. In some embodiments, the security policy module 260 receives additional signals (e.g., an indication of whether the mobile application is listed in a blacklist or a whitelist), and applies the security policy based on the output of the malware detection module 250 and the additional signals. The security policy restricts the activity of a mobile application that is determined to contain malware. For example, if the malware detection module 250 determines that a mobile application a user is trying to install contains malware, the security policy module 260 prevents the mobile application from being installed and notifies the user that the mobile application contains malware. In another example, if the malware detection module 250 identifies that a mobile application already installed in the client device of a user contains malware, the security policy module 260 may prevent the mobile application from using certain features (e.g., preventing the mobile application from using network capabilities of the mobile device). The security policy module 260 may also alert the user of the mobile application containing malware and may provide the option to the user to uninstall the mobile application.

Overview of Methodology for the Security System

Figure 3A:
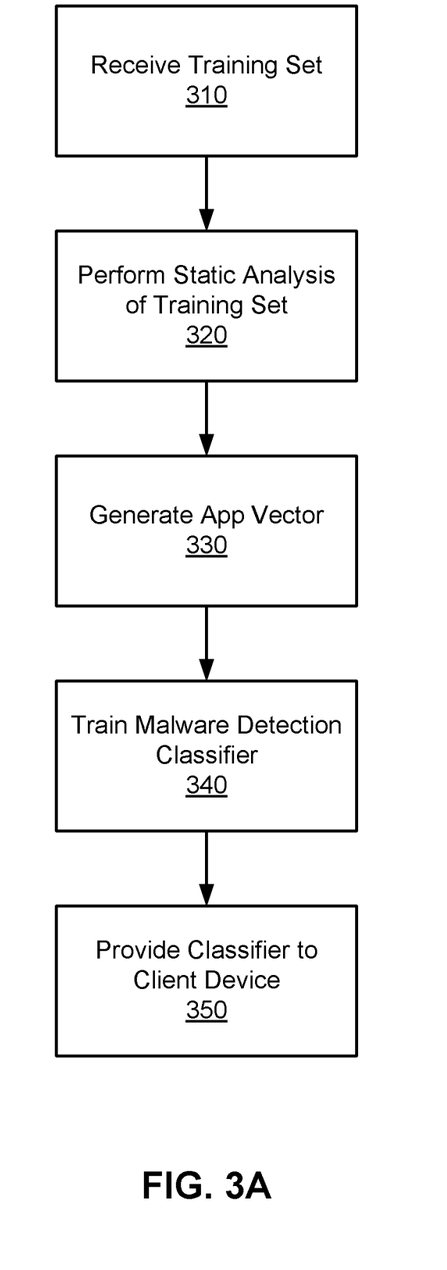
FIG. 3A is a flow diagram illustrating a process for the security system to provide a malware detection classifier for detecting malicious applications, according to one embodiment of the present disclosure.

FIG. 3A is a flow diagram illustrating a process for the security system 120 to provide a malware detection classifier for detecting malicious applications, according to one embodiment. Other embodiments can perform the steps of the process in different orders. Moreover, other embodiments can include different and/or additional steps than the ones described herein.

The security system 120 receives a training set having labeled training samples including positive samples of mobile applications known to contain malware and negative samples of mobile applications known to not contain malware (i.e., goodware). In some embodiments, the training set is stored in a local storage volume of the security system 120.

The static analysis module 210 performs 320 static analysis on the mobile applications included in the received training set. For each mobile application in the training set, the static analysis module 210 decompiles the mobile application and generates an execution graph having edges representing function calls and nodes representing called functions.

The static analysis module 210 generates 330 app vectors for the mobile applications included in the training set. For each mobile application in the training set, using the generated execution graph, the static analysis module 210 counts the number of times function calls were made to various namespaces. The counts for each of the namespaces is stored in an app vector, in which different elements of a first subset of elements of the app vector are associated with each of the namespaces being tracked. The static analysis module 210 further identifies the permissions requested by the mobile application and stores an indication of whether each permission is requested in a second subset of elements of the app vector. An embodiment of the static analysis module 210 also identifies whether a set of preselected character strings are present within the binary executable file for the mobile application and stores indications of the identified strings in a third subset of elements of the app vector.

The training module 220 trains 340 the malware detection classifier using the generated app vectors. The training module 220 uses supervised machine learning to train the classifier, with the app vectors from the positive and negative samples serving as inputs.

The security system 120 provides 350 the trained malware detection classifier to the security module 155 of a client device 150. The trained malware detection classifier is then stored in a local storage volume of the client device 150. As such, the security module 155 of the client device 150 is able to use the classifier to determine whether a mobile application contains malware.

Figure 3B:
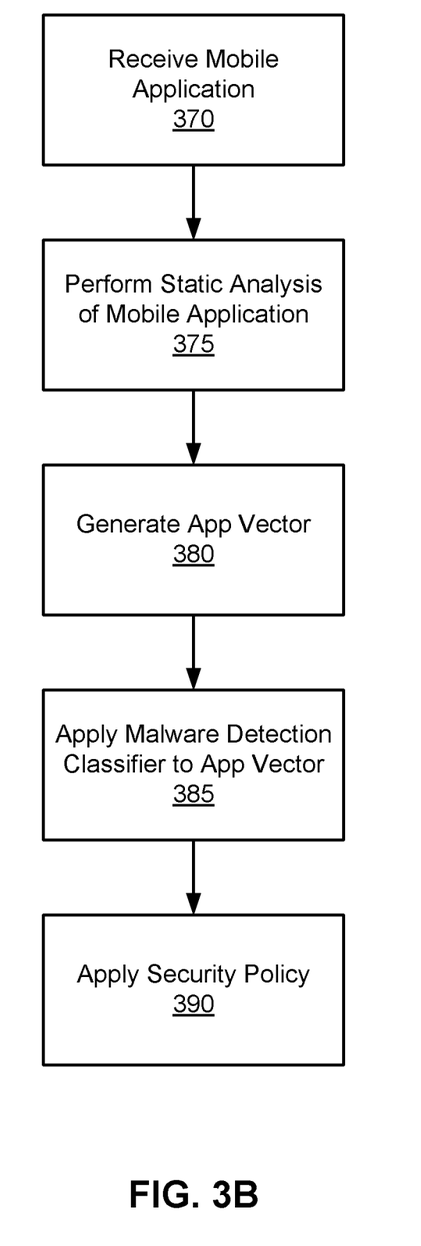
FIG. 3B is a flow diagram illustrating a process for the security module of a client device to detect malicious applications, according to one embodiment of the present disclosure.

FIG. 3B is a flow diagram illustrating a process for the security module 155 of a client device 150 to detect malicious applications, according to one embodiment. Other embodiments can perform the steps of the process in different orders. Moreover, other embodiments can include different and/or additional steps than the ones described herein.

The security module 155 receives 370 a mobile application for determining whether the mobile application is malware or goodware. In some embodiments, the security module 155 receives an executable file that is installed in the client device. In other embodiments, the security module receives an installation file for installing the mobile application in the client device.

The static analysis module 240 performs static analysis of the received mobile application. Based on the static analysis of the mobile application, the static analysis module 240 generates 380 an app vector containing information about a number of times various namespaces are used by the mobile application, indications of the permissions requested by the mobile application, and/or indications of whether certain character strings are present within the executable file of the mobile application.

The malware detection module 250 applies the malware detection classifier 255 to the app vector generated by the static analysis module 240 to determine whether the mobile application contains malware. In some embodiments, the malware detection classifier 255 250 generates one or more probability distributions indicating likelihoods that the mobile application belongs to specific classes (e.g., malware/goodware). The malware detection module 250 uses the probability distributions to produce a Boolean output indicating whether the mobile application is malware or goodware. For example, the malware detection module 250 can apply one or more thresholds to the probability distributions output by the classifier 255 to produce the Boolean output.

The security policy module 260 selects and applies 390 a security policy based on the determination of whether the mobile application contains malware. Policies applied by the security policy module 260 may include preventing the installation of an application identified as being malware, uninstalling an application identified as being malware, notifying a user that an application was identified as being malware, quarantining an application identified as being malware, and the like.

Computer Architecture

Figure 4:
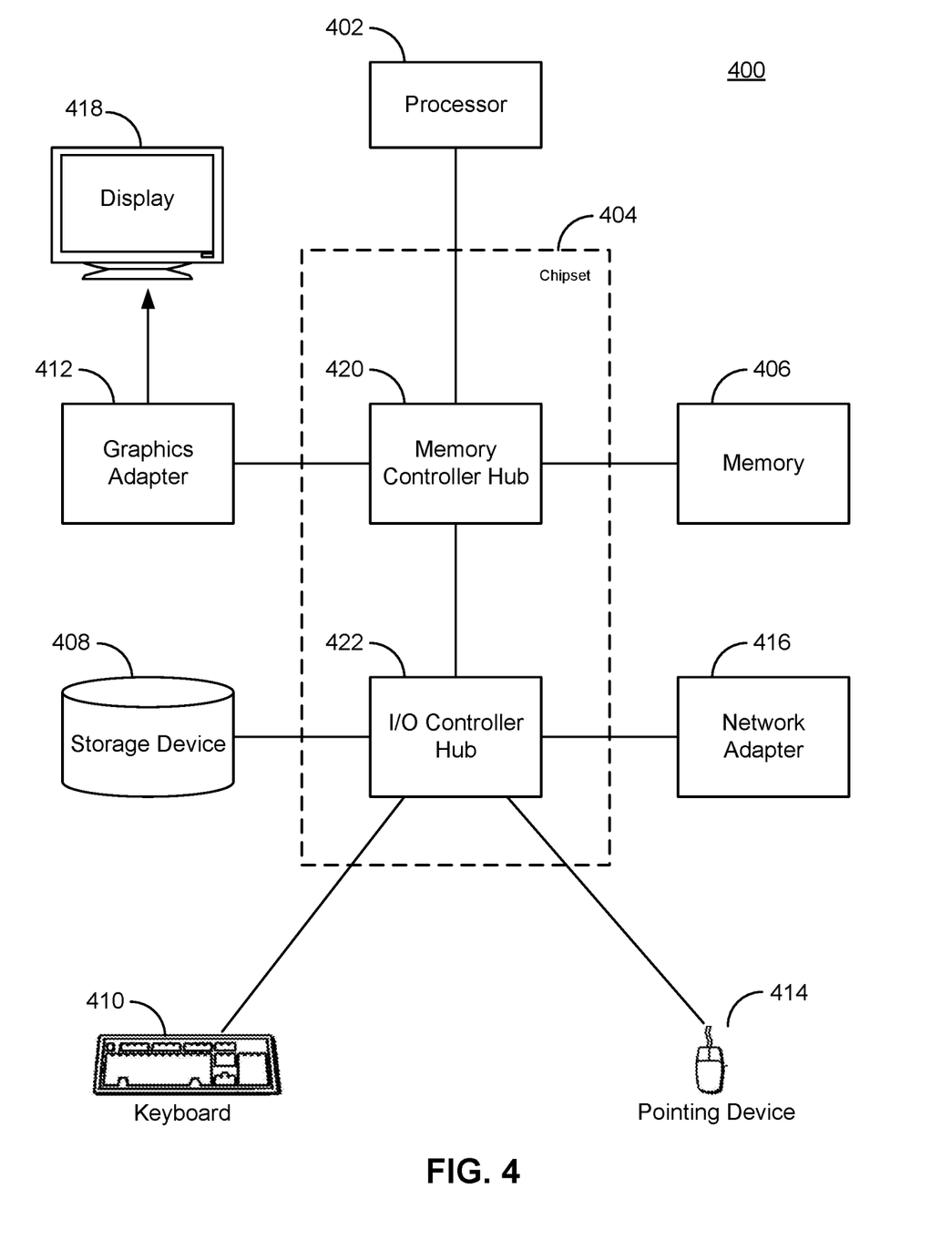
FIG. 4 is a high-level block diagram illustrating an example of a computer for use in the computing environment shown in FIG. 1 according to one embodiment of the present disclosure.

The entities shown in FIG. 1 are implemented using one or more computers. FIG. 4 is a high-level block diagram illustrating an example computer 400. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer system 400. The graphics adapter 412 displays images and other information on the display 418. The network adapter 416 couples the computer system 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the entities of FIG. 1 can vary depending upon the embodiment and the processing power required by the entity. For example, the security system 120 might comprise multiple blade servers working together to provide the functionality described herein. As another example, the client device 150 might comprise a mobile telephone with limited processing power. The computers 400 can lack some of the components described above, such as keyboards 410, graphics adapters 412, and displays 418.

Additional Configuration Consideration

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for classifying unknown files as malicious or legitimate taking into account sequences of operation codes in machine language instructions of the unknown files. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting malware, comprising:

receiving a training set including a plurality of mobile applications containing malware and a plurality of mobile applications not containing malware;

performing static analysis on the plurality of mobile applications included in the training set, the static analysis comprising generating a vector for a mobile application of the plurality of mobile applications by:

for each namespace of a plurality of namespaces, identifying, during static analysis, a number of times the mobile application calls a function from the namespace, identifying, during static analysis, a set of permissions the mobile application requests, and generating, during static analysis, a vector storing values representing the number of times the mobile application calls a function from each of the namespaces, and an indication of the permissions the mobile application requests;

training a classifier for detecting malware using the generated vector; and providing the trained classifier to a client device, wherein the client device is adapted to apply the trained classifier to a vector for a candidate mobile application to determine whether the candidate application contains malware.

2. The computer-implemented method of claim 1, wherein generating the vector storing values representing the number of times the mobile application calls a function from each of the namespaces, and an indication of the permissions the mobile application requests comprises:

representing a first subset of vector elements as values indicative of the numbers of times the mobile application calls functions from specific namespaces; and representing a second subset of vector elements as values indicative of whether specific permissions are requested by the mobile application.

3. The computer-implemented method of claim 1, wherein generating a vector for the mobile application further comprises:

decompiling the mobile application;

generating an execution graph of the decompiled mobile application, the execution graph including nodes representing function calls performed by the mobile application; and traversing the generated execution graph to determine numbers of times functions from the namespaces are called by the mobile application.

4. The computer-implemented method of claim 3, wherein traversing the generated execution graph comprises:

identifying one or more entry points to the mobile application;

identifying a function call from an entry point of the application;

determining that a function of the identified function call is associated with a first namespace; and responsive to determining that the function of the identified function call is associated with the first namespace, increasing a first counter of a plurality of counters, the first counter associated with the first namespace.

5. The computer-implemented method of claim 3, wherein identifying a set of permissions the mobile application requests comprises:

identifying a function call from the execution graph of the mobile application, the function call for requesting a first permission to use a function of a mobile device; and storing a value to a vector element the vector associated with the first permission.

6. The computer-implemented method of claim 1, wherein identifying a set of permissions the mobile application requests comprises:

analyzing a manifest file for the mobile application to identify a set of permissions listed in the manifest file as permissions to be requested by the mobile application.

7. The computer-implemented method of claim 1, wherein generating a vector for the mobile application further comprises:

determining whether particular ones of a plurality of character strings are found within the mobile application;

wherein generating the vector comprises storing values indicating which particular ones of the plurality of character strings are found within the mobile application.

8. A non-transitory computer readable storage medium storing executable computer program code for detecting malware, the instruction when executed by a processor causing the processor to perform operations comprising:

receiving a training set including a plurality of mobile applications containing malware and a plurality of mobile applications not containing malware;

performing static analysis on the plurality of mobile applications included in the training set, the static analysis comprising generating a vector for a mobile application of the plurality of mobile applications by:

for each namespace of a plurality of namespaces, identifying, during static analysis, a number of times the mobile application calls a function from the namespace, identifying, during static analysis, a set of permissions the mobile application requests, and generating, during static analysis, a vector storing values representing the number of times the mobile application calls a function from each of the namespaces, and an indication of the permissions the mobile application requests;

training a classifier for detecting malware using the generated vector; and providing the trained classifier to a client device, wherein the client device is adapted to apply the trained classifier to a vector for a candidate mobile application to determine whether the candidate application contains malware.

9. The non-transitory computer readable storage medium of claim 8, wherein generating the vector storing values representing the number of times the mobile application calls a function from each of the namespaces, and an indication of the permissions the mobile application requests comprises:

representing a first subset of vector elements as values indicative of the numbers of times the mobile application calls functions from specific namespaces; and representing a second subset of vector elements as values indicative of whether specific permissions are requested by the mobile application.

10. The non-transitory computer readable storage medium of claim 8, wherein generating a vector for the mobile application further comprises:

decompiling the mobile application;

generating an execution graph of the decompiled mobile application, the execution graph including nodes representing function calls performed by the mobile application; and traversing the generated execution graph to determine numbers of times functions from the namespaces are called by the mobile application.

11. The non-transitory computer readable storage medium of claim 10, wherein traversing the generated execution graph comprises:

identifying one or more entry points to the mobile application;

identifying a function call from an entry point of the application;

determining that a function of the identified function call is associated with a first namespace; and responsive to determining that the function of the identified function call is associated with the first namespace, increasing a first counter of a plurality of counters, the first counter associated with the first namespace.

12. The non-transitory computer readable storage medium of claim 10, wherein identifying a set of permissions the mobile application requests comprises:

identifying a function call from the execution graph of the mobile application, the function call for requesting a first permission to use a function of a mobile device; and storing a value to a vector element of the vector associated with the first permission.

13. A computer-implemented method for determining whether a mobile application contains malware, comprising:

receiving a trained classifier for detecting malware;

performing static analysis of the mobile application, the static analysis comprising generating a vector by:

for each namespace of a plurality of namespaces, identifying, during static analysis, a number of times the mobile application calls a function from the namespace, identifying, during static analysis, a set of permissions the mobile application requests, and generating, during static analysis, a vector storing values representing the number of times the mobile application calls a function from each of the namespaces, and an indication of the set of permissions the mobile application requests;

applying the received trained classifier to the generated vector; and applying a security policy to the mobile application based on an output of the trained classifier applied to the generated vector.

14. The computer-implemented method of claim 13, wherein generating the vector storing values representing the number of times the mobile application calls a function from each of the namespaces, and an indication of the set of permissions the mobile application requests comprises:

representing a first subset of vector elements as values indicative of the numbers of times the mobile application calls functions from specific namespaces; and representing a second subset of vector elements as values indicative of whether specific permissions are requested by the mobile application.

15. The computer-implemented method of claim 13, wherein generating the vector for the mobile application further comprises:

decompiling the mobile application;

generating an execution graph of the decompiled mobile application, the execution graph including nodes representing function calls performed by the mobile application; and traversing the generated execution graph to determine numbers of times functions from the namespaces are called by the mobile application.

16. The computer-implemented method of claim 15, wherein traversing the generated execution graph comprises:

identifying one or more entry points to the mobile application;

identifying a function call from an entry point of the application;

determining that a function of the identified function call is associated with a first namespace; and responsive to determining that the function of the identified function call is associated with the first namespace, increasing a first counter of a plurality of counters, the first counter associated with the first namespace.

17. The computer-implemented method of claim 15, wherein identifying a set of permissions the mobile application requests comprises:

identifying a function call from the execution graph of the mobile application, the function call for requesting a first permission to use a function of a mobile device; and storing a value to a vector element of a second subset of vector elements associated with the first permission, the second subset of vector elements including values indicative of whether specific permissions are requested by the mobile application.

18. The computer-implemented method of claim 13, wherein generating a vector for the mobile application further comprises:

determining whether particular ones of a plurality of character strings are found within the mobile application;

wherein generating the vector comprises storing values indicating which particular ones of the plurality of character strings are found within the mobile application.

19. The computer-implemented method of claim 13, wherein the trained classifier is trained by:

generating vectors for each mobile application of a plurality of mobile applications included in a training set by performing static analysis on the mobile applications in the training set to generate vectors storing values representing the numbers of times the mobile applications call function from the namespaces, and storing indications of the sets of permissions the mobile applications request; and training the classifier using the generated vectors.

20. The computer-implemented method of claim 13, wherein applying the security policy comprises:

applying a security policy restricting activity of the mobile application responsive to the output of the trained classifier indicating that the application contains malware.

* * * * *